US006516614B1

(12) United States Patent
Knoll

(10) Patent No.: US 6,516,614 B1
(45) Date of Patent: Feb. 11, 2003

(54) METHOD AND CONTROL DEVICE FOR CONTROLLING A HYDRAULIC CONSUMER

(75) Inventor: Burkhard Knoll, Lohr (DE)

(73) Assignee: Bosch Rexroth AG, Lohr (DE)

( * ) Notice: Subject to any disclaimer, the term of this patent is extended or adjusted under 35 U.S.C. 154(b) by 0 days.

(21) Appl. No.: 09/831,766

(22) PCT Filed: Nov. 11, 1999

(86) PCT No.: PCT/DE99/03601

§ 371 (c)(1), (2), (4) Date: Jun. 8, 2001

(87) PCT Pub. No.: WO00/32944

PCT Pub. Date: Jun. 8, 2000

(30) Foreign Application Priority Data

Nov. 30, 1998 (DE) ........................................ 198 55 187

(51) Int. Cl.[7] ................................................ F16D 31/00
(52) U.S. Cl. ............................................ 60/327; 60/452
(58) Field of Search ........................... 60/452, 327, 459

(56) References Cited

U.S. PATENT DOCUMENTS 5,067,389 A * 11/1991 St. Germain .............. 60/452 X
5,146,747 A * 9/1992 Sugiyama et al. ........ 60/452 X
5,251,444 A * 10/1993 Ochiai et al. ............. 60/452 X
5,315,826 A 5/1994 Hirata et al.
5,438,832 A * 8/1995 Yonekubo et al. ........ 60/452 X
5,469,703 A * 11/1995 Ericsson et al. .......... 60/452 X
5,699,665 A * 12/1997 Coolidge .................. 60/452 X
5,806,312 A * 9/1998 Kauss et al. .............. 60/452 X

FOREIGN PATENT DOCUMENTS

| | | | |
|---|---|---|---|
| DE | 36 05 312 | A1 | 8/1986 |
| DE | 3532816 | A1 | 3/1987 |
| DE | 4308004 | A1 | 10/1993 |
| DE | 196 46 428 | A1 | 5/1998 |
| DE | 198 36 564 | A1 | 2/2000 |
| EP | 0 515 692 | A1 | 12/1992 |
| EP | 0 516 864 | A1 | 12/1992 |
| EP | 0 536 398 | A1 | 4/1993 |
| EP | 0 566 449 | A1 | 10/1993 |
| EP | 0 837 249 | A1 | 4/1998 |
| WO | WO 95/32364 | | 11/1995 |

* cited by examiner

*Primary Examiner*—Edward K. Look
*Assistant Examiner*—Michael Leslie
(74) *Attorney, Agent, or Firm*—Oliff & Berridge, PLC

(57) ABSTRACT

A method and a control arrangement for driving at least one hydraulic consumer are disclosed. The control arrangement comprises a pump whose output is adjustable as a function of the load pressure of a consumer. The consumer is driven through a proportional directional valve forming a measuring orifice, a pressure compensator being associated with the directional valve, allowing the pressure drop across the measuring orifice to be maintained constant irrespective of the load pressure. According to the invention, a low load pressure is indicated to the pump when the pressure compensator is completely open, so that the pressure drop across the measuring orifice is reduced.

17 Claims, 4 Drawing Sheets

METHOD AND CONTROL DEVICE FOR CONTROLLING A HYDRAULIC CONSUMER

DESCRIPTION

The present invention relates to a method for driving a consumer according to the preamble of claim 1 and to a control arrangement for driving a hydraulic consumer according to the preamble of claim 2.

Such a control arrangement is known, for example, from WO 95/32364 A1. In this known approach, a variable pump is controlled in such a way that it produces a pressure at its output that exceeds the highest load pressure of all hydraulic consumers of the control arrangement by a certain differential amount. To do this, constant pumps in combination with a threeway flow control valve or variable pumps having a variable stroke volume may be used.

With variable pumps, a load-sensing regulator is provided for such load-sensing controls, where the pump pressure is applicable in order to reduce the volume of the variable pump and where, in order to increase the stroke volume of the pump, the maximum load pressure and a pressure spring are applicable. The difference between the pump pressure and the maximum load pressure corresponds to the force exerted by said pressure spring. In said load-sensing circuits, each consumer has associated with it a variable measuring orifice as well as an upstream or downstream pressure compensator, through which the pressure drop across the measuring orifice is kept constant so that the amount of pressure fluid flowing to a hydraulic consumer depends solely on the opening cross section of the measuring orifice rather than on the load pressure of the consumer or on the pump pressure When the pressure compensators are downstream of the measuring orifice and when the pump has been varied to the maximum pressure volume and the pressure fluid flow is not sufficient for maintaining the predetermined pressure drop across the measuring orifices of all consumers, the pressure compensators of all of the driven hydraulic consumers are varied in the closing direction, so that all pressure fluid flows directed to the individual consumers are reduced by the same percentage. In such a load-independent flow distribution (LIFD), all driven consumers then move at a velocity reduced by the same value.

In LIFD systems, the flow channels for indicating the maximum load pressure for pump control and the pressure springs of the individual pressure compensators are designed in such a way that the load pressure is indicated to the pump regulator without falsification.

In some applications the hydraulic pump provides a stand-by pressure, for example at 20 bar (284.4 psi), which is needed for driving a number of consumers or valve arrangements. The pressure differential corresponding to the stand-by pressure must be reduced at the measuring orifices associated with the other consumers, so that considerable energy losses occur.

To alleviate this, it is an object of the invention to create a method and a control arrangement for driving at least one hydraulic consumer while keeping the energy losses at a minimum.

With reference to the method, the object is solved by the features of claim 1 and, with reference to the control arrangement, by the features of claim 2.

While in the prior art load sensing systems the control spring of the pressure compensator has always been designed as a weak spring, so as not to falsify the load pressure indicated to the hydraulic pump when the pressure compensator is completely open, according to the invention, however, a reduced load pressure is indicated to the pump. The stroke volume of the pump is adjusted as a function of said indicated (reduced) load pressure so that the pressure loss across the measuring orifice is smaller than the pressure differential at the pump regulator (variable pump). This means that the pressure drop across the measuring orifice is reduced as compared with the conventional approaches so that a corresponding energy economy is also achieved.

In the control arrangement used for carrying out the method said reduction of the load pressure indicated to the pump regulating means is achieved by appropriately designing the control spring acting on a control piston of the pressure compensator. Said spring is designed to have a considerably higher spring stiffness or bias as compared to the prior aria so that the spring force roughly corresponds to the pressure by which the load pressure indicated to the pump regulator is to be reduced compared to the load pressure actually applied. This means that the control arrangement differs from the prior art approaches essentially in the choice of the spring, so that existing control arrangements may easily be upgraded.

When using a control spring having an increased spring stiffness or increased bias, the effective spring force is preferably adjusted in such a manner that it corresponds to about half the pressure differential applied to the pump regulator or being present as a pressure drop at the prior art measuring orifice.

The response performance of the control arrangement is particularly advantageous when the spring force of the spring remains constant over the entirety of the stroke, i.e. ranging from a position where the control piston is completely closed to a completely open position. This can easily be achieved especially by a convenient pressure fluid flow control in which the flow forces resulting from the pressure fluid flow act in the closing direction as well as in the opening direction of the pressure compensator, and by choosing the flow forces in such a way that, together with the force of the control spring, they add up to a constant independent of the stroke of the control piston.

Such a pressure fluid flow control is known for example from the later publication of German Patent Application No. P 198 36 564.0, which disclosure is included herein by reference.

For the case that limiting the load pressure in the load pressure indicating line leading up to the pump is provided by a pressure limiting valve, the pressure compensator is preferably provided with a nozzle bore through which, when the pressure compensator is completely open, the load pressure is fed into the load pressure channel. When a plurality of pressure compensators are completely open and when the pressure limiting valve is open, the loss flows are reduced through the nozzle bores in the pressure compensators associated with the individual consumers. Providing such a nozzle bore is also in contrast to the designs previously used in load sensing systems, since conventionally—as mentioned above—always an unfalsified load pressure was indicated to the pump regulating means. For this reason, the hydraulic resistance of the flow channel extending to the pump regulator has always been chosen to be as small as possible, so that the pressure drop and a falsification of the load pressure is as small as possible when the pressure compensator is completely open.

The pressure in the load pressure indicating line is preferably indicated through a further communication bore in the pressure compensator to the spring chamber of the control piston, said communication bore comprising an damping nozzle for damping pressure variations.

The control arrangement according to the invention can be designed having a variable pump and an associated control unit or a constant pump having an input pressure compensator (three-way flow control valve).

Other advantageous developments of the invention are the subject matter of the dependent claims.

In the following, a preferred embodiment of the invention will be described in more detail with reference to the drawings, in which.

Figure 1:
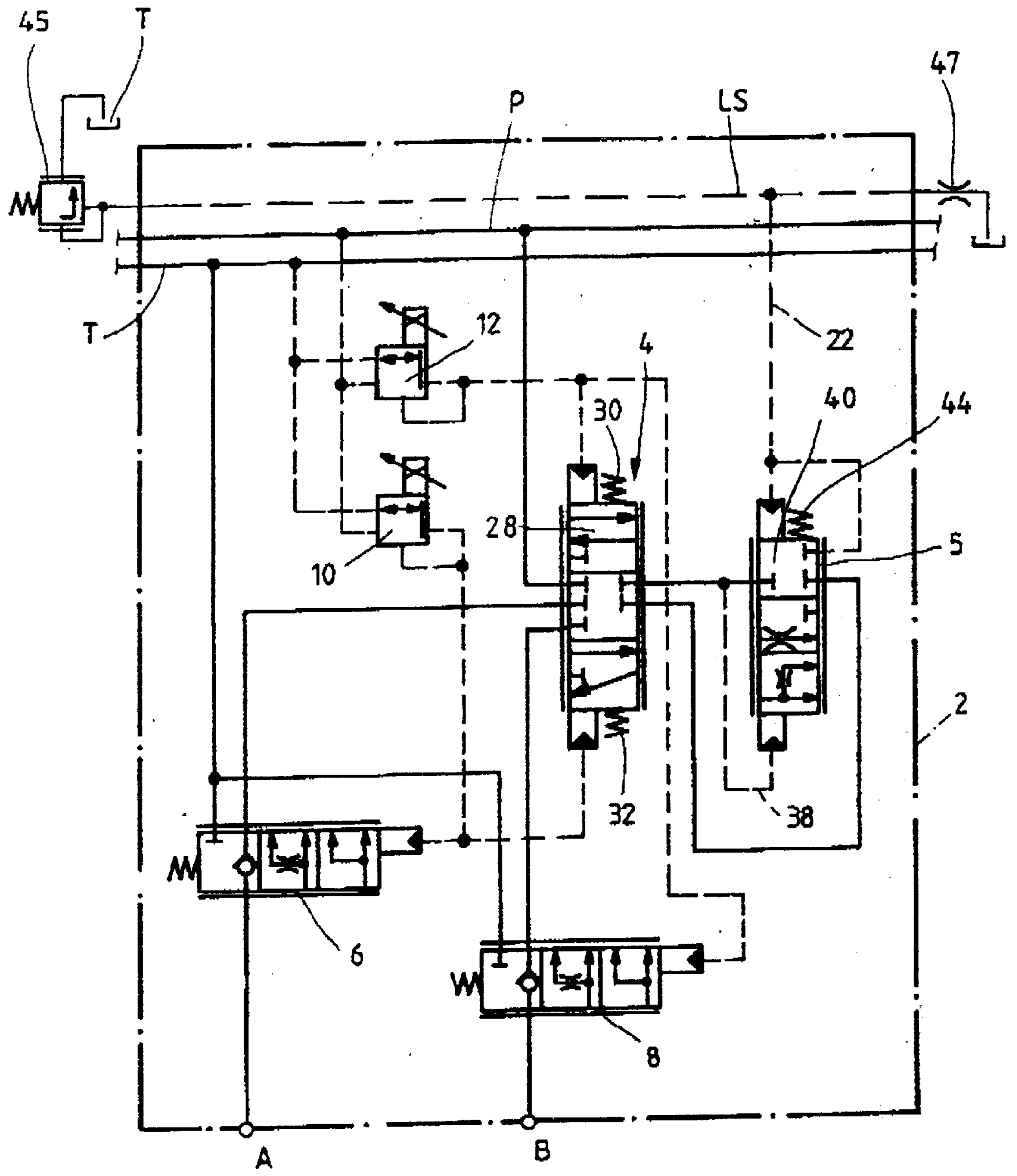
FIG. 1 shows a circuit diagram of a control arrangement according to the invention.

FIG. 1 shows a circuit diagram of a valve disk 2 of a valve block having two working connections A, B, one tank connection T and one pump connection P. A consumer such as a hydraulic motor 116 or a double-acting cylinder (not shown) is connected to the two working connections A, B. One of the working connections A, B may be connected to the pump connection P via the hydraulic circuit, while the other one of the two working connections B, A is connected to the tank connection T.

The valve disk further comprises a control connection LS, through which the load pressure may be sensed at the associated consumer.

The pump (not shown) is formed as a variable pump whose delivery rated is controlled as a function of the load pressure of the consumers. Such load sensing circuits are well known in the art, so that a more detailed description is not needed. When a plurality of consumers are driven by circuits having the structure shown in FIG. 1, the highest pressure applied to any one of the consumers is indicated to the pump, and the delivery rate is adjusted as a function of said highest pressure.

A continuously variable directional valve 4 is arranged in the valve disk 2, having a direction member determining the drive direction of the consumer and a velocity member forming the measuring orifice. The measuring orifice (velocity member) formed by the directional valve 4 has a downstream pressure compensator 5, whose control piston 40, in its control position, keeps the pressure drop across the measuring orifice constant irrespective of load pressure. The output connection of the pressure compensator 5 has a hydraulic connection to the direction member of the directional valve 4, through which, depending on the drive, one of the working connections A, B is provided with pressure fluid and the other is connected to the tank connection T. Continuously variable, releasable check valve arrangements 6, 8 are connected in the working lines leading to the working connections A, B, which check valve arrangements 6, 8, in their locked position, do not allow a return flow from the consumers, and which, in their released, flow-through position, allow a return flow from the corresponding working connection A or B to the tank connection T.

Driving of the directional valve 4 is carried out via the pilot valves 10, 12, through which a control pressure can be applied to the end faces of a directional valve slide 28 of the directional valve 4 in order to push the latter out of its shown neutral position. The directional valve slide 28 is biased in its neutral position by two pressure springs 30, 32. The force of a control spring 44 and the highest load pressure of the consumers are applied to th control piston 40 of the pressure compensator 5 in its closing direction, which load pressure is sensed at the consumer through a load pressure channel 22. The pressure downstream of the directional valve 4 is directed through a control line 38 to the end face of the control piston 40 acting in the opening direction.

The pilot valves 10, 12 are designed to be continuously variable, so that a pressure in the order of between the tank pressure and the pressure at the pump connection P can be applied to the end faces of the directional valve slide 28. This control pressure is also used for unlocking the check valve arrangements 6 and 8.

A pressure limiting directional valve 45 is provided in the portion of the load pressure channel 22 common to all consumers, limiting the load pressure in the load pressure channel 22. A spring is applied to the pressure limiting directional valve 45 in its closing direction and the highest load pressure is applied to it in its opening direction. When the maximum pressure is exceeded, control oil is bled to the Tank T. Moreover, the load pressure channel 22 is connected to the tank via a tank throttle 47.

Figure 2:
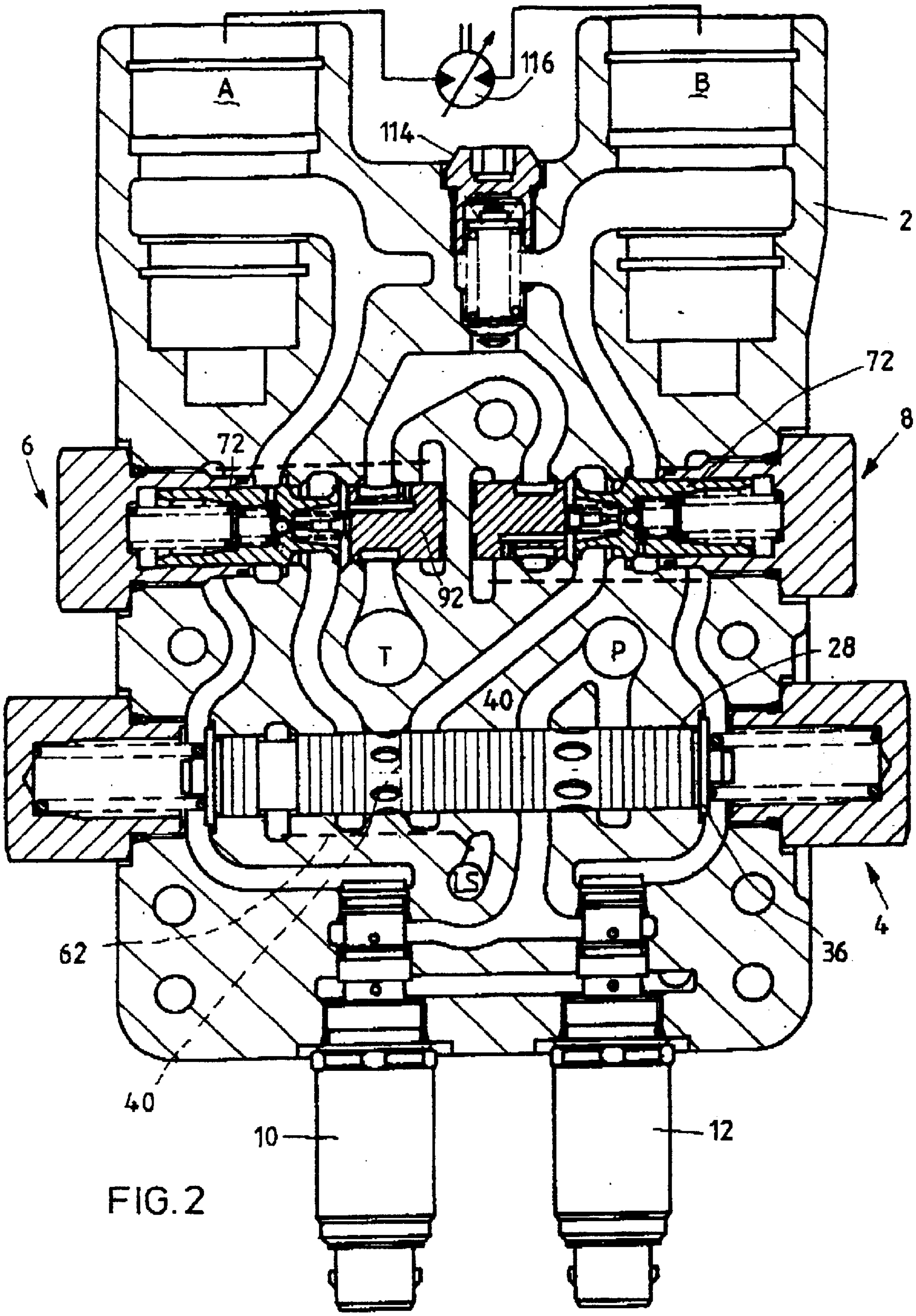
FIG. 2 shows a valve disk together with the control arrangement of FIG. 1.

FIG. 2 shows a concrete embodiment of the valve disk 2, in which the circuit according to FIG. 1 is realized.

As already mentioned, the valve disk 2 comprises the two working connections A, B as well as a pump connection P and the tank connection T, passing through the valve disk pack of the valve block in a direction vertical to the plane defined by the drawing. Moreover, the highest load pressure of all consumers driven by the valve block is directed to a control connection LS connected to the load pressure channel 22.

The valve disk 2 comprises receiving bores for the directional valve 4 whose directional valve slide 28 is formed as a hollow slide. The control piston 40, only shown as a broken line in FIG. 2, is slidably mounted within the directional valve slide 28.

The two releasable check valve arrangements 6, 8 are inserted in the valve disk 2 in a parallel direction to the directional valve 4. Each of the check valve arrangements 6 comprises a main taper 72 provided with a forward opening, the main taper 72 acting together with a push-open piston 92, through which the main taper 72 can be lifted off its valve seat to unlock the valve.

The two pilot valves 10, 12 are formed in a cartridge design and screwed into the bottom surface of the valve disk 2 in FIG. 2. The pilot valves 10, 12 are for example electrically actuated pressure limiting valves, through which the pressure at the pump connection P can be reduced to a system pressure at the axial output connection of each pilot valve 10, 12. As can be seen from FIG. 1, each pilot valve 10, 12 has a radial connection connected with the tank connection T as well as an input connection connected to the pump connection P.

In order to make the pressure at tank connection T safe, a check valve 114 is also provided in the valve disk 2.

With respect to further details of the check valve arrangement 6, 8 and the pilot valves 10, 12 and their operation, reference is made to the publication of German Patent Application No. 196 46 428 A1 of the same applicant.

The design of the directional valve 4 and the pressure compensator 5 will be described in the following with reference to the partial view shown in FIG. 3.

With reference to said figure, the valve disk 2 comprises a valve bore 50 for receiving the directional valve slide 28, in which bore radially outwardly extending annular chambers 52, 54, 56, 58 and 60 are formed. As can be seen from FIG. 3, the annular chamber 52 is connected with the load pressure channel 22, leading to the control connection LS, via a load pressure indicating line 62, indicated as a broken line in FIG. 2.

The two annular chambers 54 and 56 lead to the working connections A and B via working channels 66 and 68, respectively.

The annular chamber 58 is connected on the one hand to the pump connection P via a pump line 70 and on the other hand to a radial connection of the pilot valves 10, 12 via a connection channel 74. The annular chamber 60 is also hydraulically linked with the pump connection P.

The axial output connections of the pilot valves 10, 12 shown in FIG. 2, are connected to the spring chambers 80, 82 of the directional valve 4 via control channels 76, 78. From there, the control channels 76, 78 extend further to the check valve arrangements 8 and 8, respectively.

Figure 3:
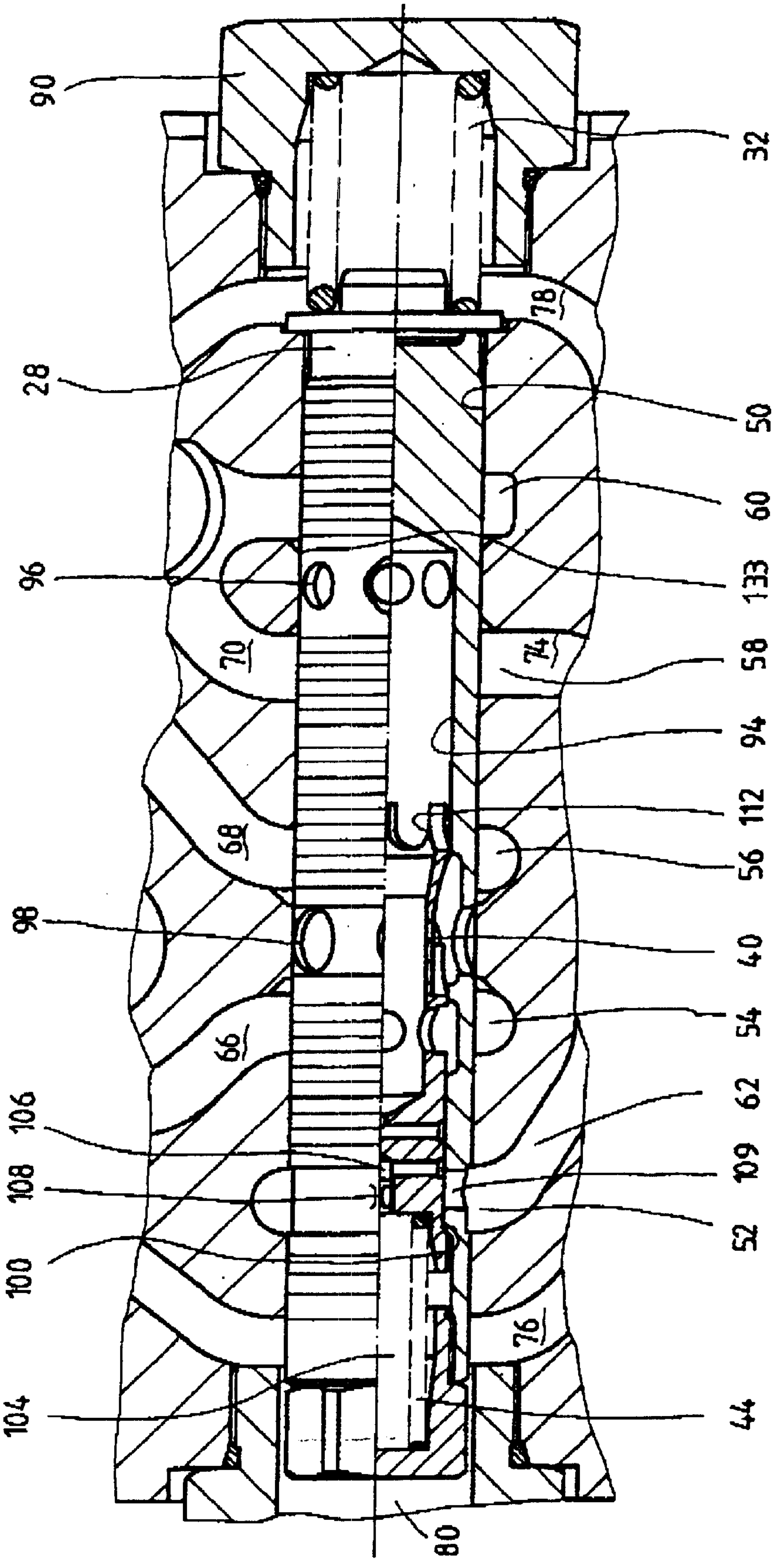
FIG. 3 shows a partial view of a valve arrangement having a variable measuring orifice and a downstream pressure compensator.

The directional valve slide 28 is biased in its basic position as shown in FIG. 3 via pressure springs 32.

The two pressure springs 32 push against screw caps 90, closing off the valve bore 50 in an axial direction.

As mentioned above, the directional valve slide 28 is formed as a hollow piston and has an axial bore 94 extending, in the drawing of FIG. 3, from the left-hand end portion of the directional valve slide 28 to the area of the annular channel 60. Radially arranged measuring orifice bores 96 lead into said axial bore 94, where the holes are formed as radial bores in the directional valve slide sleeve. In the basic position shown, the radially arranged measuring orifice bores 96 are disposed between the two annular chambers 58, 60.

In the axial distance leading up to the radially arranged measuring orifice bores 96, there are radially arranged directional bores 98 which, in their basic position shown, are disposed bet n the two annular chambers 54, 56.

Using the described geometrical arrangement, depending on how the directional valve slide 28 is driven, the pressure fluid may be directed from the pump connection P to consumer A via the pump line 70, the radially arranged measuring orifice bores 96, the axial bore 94, the radially arranged directional bores 98 and the working channel 66 or, correspondingly, to the consumer B via the annular chamber 60, the radially arranged measuring orifice bores 96, the axial bore 94, the radially arranged directional bores go and the working channel 68.

The control piston 40 is slidably mounted within the axial bore 94 and biased in its closing direction by the control spring 44 having an annular face 100 against a stop collar of the axial bore 94. A control piston spring chamber 104 is connected with the annular chamber 52 via a connecting bore 106, a damping throttle 108 and a passage 109 in the directional valve slide 28, so that the load pressure also biases the control piston 40 in the closing direction.

Figure 4:
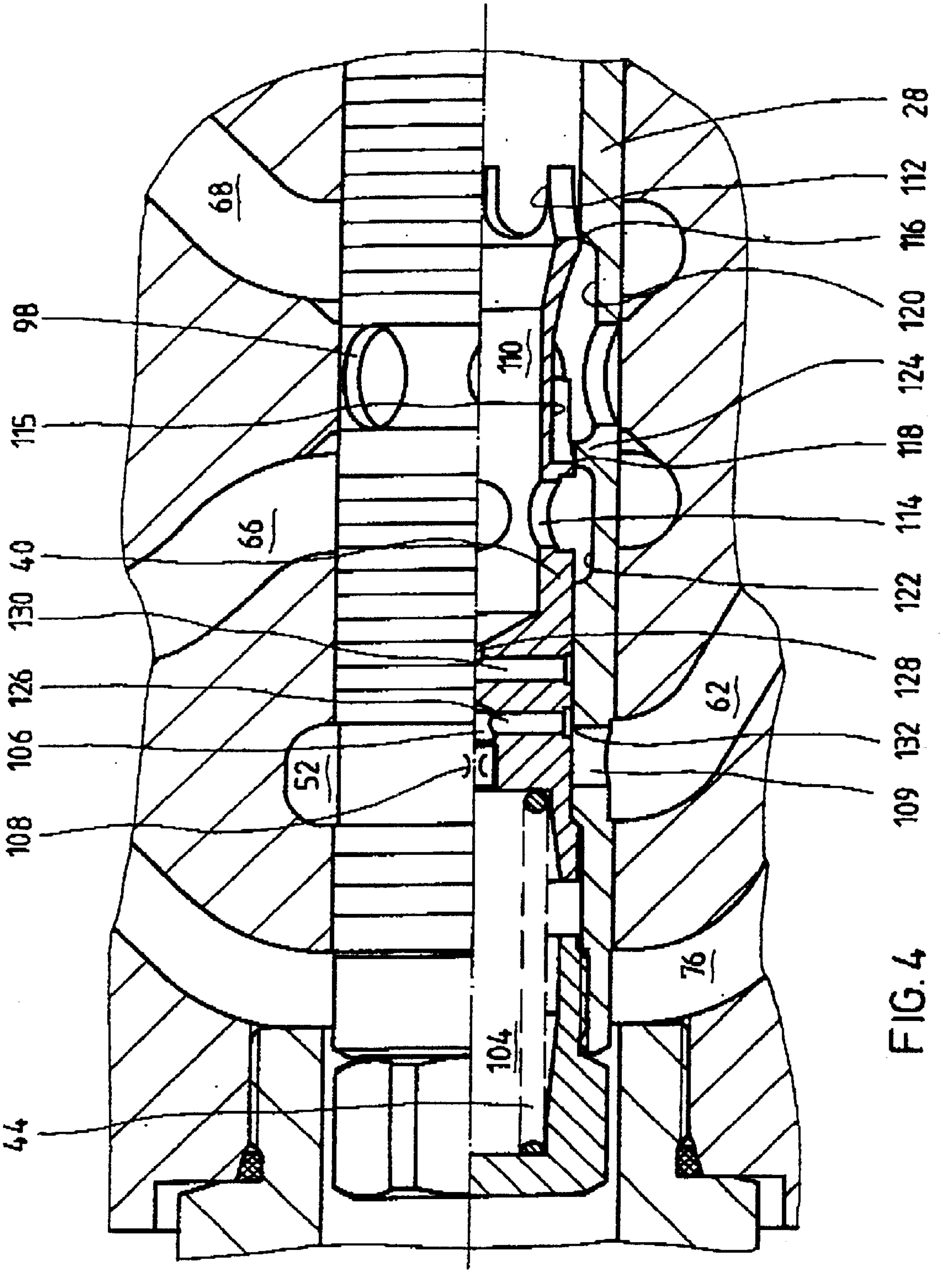
FIG. 4 shows a partial view of the valve arrangement of FIG. 3.

According to the enlarged view of FIG. 4, the control piston 40 has an axial blind hole 110, opening out into the right-hand end face (in FIG. 4) of the control piston 40. At said opening, the sleeve of the control piston 40 has radial passages 112 through it forming a crown. At a distance from the latter, radially arranged compensating bores 114 are formed which, in the position shown, are in the area of the annular chamber 54.

In the area between the passages 112 and the radially arranged bores 114, the control piston 40 has a radial step-like reduction, so that in the area of the passages 112, a first control edge 116 is formed as well as a second control edge 118 in the area of the radially arranged compensating bores 110.

The radially reduced portion 115 is formed as an angled surface in the area of the first control edge 116, while it has the form of a radial step in the area of the second control edge 118.

With reference to FIG. 4, the directional valve slide 28 comprises two axially spaced annular grooves 120, 122 formed in the interior circumferential surface of the axial bore 94.

The two annular grooves 120, 122 are separated from each other by an intermediary segment 124 acting together with the second control edge 118. The right-hand circumferential edge (according to the view shown in FIG. 4) of the first annular groove 120 acts together with the first control edge 116, so that when the control piston 40 is axially displaced a control cross section is opened up by the combined action of the first control edge 116 and the first annular groove 120, while a compensating control cross section is opened up by the combined action of the second control edge 118 and the intermediary segment 124. In the basic position shown, the two control cross sections are closed. With respect to further details of the present compensating flow control, the later publication of German Patent Application No. 198 36 564.0 should be referred to.

The radially arranged directional bores 98 open out into the first annular groove 120. According to FIG. 4, the communication bore 106 is formed as an angular bore, where a radial bore portion 126 of the communication bore 106 opens out into the passage 109 of the directional valve slide 28. The radial bore portion 126 is disposed in such a way that the communication between the annular channel 52 and the spring chamber 104 is in an opened condition during the whole of the stoke of the control piston 40. This means that the force of the control spring 44 and the load pressure present in the load pressure channel 22 are always applied to the control piston 40 in its closing direction.

At its left-hand end section, the axial bore 110 of the control piston 40 opens out into a nozzle bore 128 which in turn communicates with a radial bore 130 of the control piston 40.

In the basic position of the control piston 40 as shown, the radial bore 130 is closed off by the interior circumferential wall of the directional valve slide 28. When the control piston 40 is axially displaced with reference to the directional valve slide 28, the radial bore 130 is opened up by a control edge 132 formed by the passage 109 in the directional valve slide sleeve. This means that with every movement of the control piston 40 against the force of the control spring 44 and the control pressure present in the spring chamber, the pressure downstream of the measuring orifice is indicated to the load pressure channel 22 and therefore also to the spring chamber 104. The cross section of the nozzle bore 128 is considerably smaller than the corresponding communicating cross sections in the abovementioned conventional pressure compensators. The latter always used to be dimensioned in such a way that the pressure drop across this communicating bore was only negligible, so that when the control piston 40 is fully open the load pressure is indicated to the control pump without falsification.

By the small opening cross section of the nozzle bore 128 according to the invention, when the pressure limiting directional valve 45 is open, the amount of control oil flowing out of the load pressure channel 22 to the tank T is reduced, so that the response performance and the efficiency of the hydraulic control is improved.

The control spring 44 in the embodiment shown is provided with a high bias or a high spring stiffness, so that about half of the stand-by pressure of the variable pump must be applied to displace the control piston 40 against the force of the control spring 44. This means that at a stand-by pressure of about 20 bar (284.4 psi), which is needed with the present circuit for actuating the pilot valves 10, 12, the control spring 44 is designed to be approximately a 10 bar (142.2 psi) spring. The pressure fluid flow along the control piston 40 is managed by a suitable geometrical design of the abovementioned control cross section and the compensating control cross section acting in the opposite direction, so that the resultant force of the force of the control spring 44 and the flow forces acting on the control piston is a constant irrespective of the control piston stroke. In other words, the control spring 44 and the flow forces are tuned in such a way that they result in a horizontal spring characteristic in which the spring force is independent of the stroke of the control piston 40.

To better understand the invention, the operation of the control arrangement according to the invention is explained in the following. It will be assumed that only a single consumer is to be provided with pressure fluid through the valve block. To do this, the pilot valves 10, 12 are suitably driven, so that a control pressure differential acts on the end faces of the directional valve slide 28. Depending on said control pressure differential, the directional valve slide 28 is displaced from its spring biased basic position, so that the radially arranged measuring orifices 96 are opened up for example by a control edge 133. By axially displacing the directional valve slide 28 also the radially arranged directional bores 98 are opened up, so that the working channel 66 is provided with pressure fluid from the pump, and the working channel 68 is connected to the tank connection T.

The pressure fluid enters the axial bore 94 through the opened radially arranged measuring orifice bores 96, so that the control piston 40 of the pressure compensator has a force applied to it acting in its opening direction against the force the control spring 44. By building up pressure at the input of the pressure compensator 5, the control piston 40 is brought into its left-hand end position (as shown in FIG. 3), so that the compensating cross section and the control cross section are completely opened up. In this, the radial bore 130 is opened up by the control edge 132, so that the pressure at the input of the pressure compensator 5 is indicated to the load pressure indicating line 62, and therefore to the load pressure channel 22, via the axial blind hole 110, the nozzle bore 128, the radial bore 130 and the passage 109. Said load pressure indicated to the load pressure channel 22, however, is weaker, by the force of the control spring 44, than the load pressure present at the input of the pressure compensator and in the working channel 66. The variable pump is then driven as a function of said weak load pressure.

For reasons of clarity, another example will be given using numbers. It will be assumed that the stand-by pressure of the variable pump is 20 bar (284.4 psi). The load pressure at the input of the pressure compensator, i.e. in the working channel 66, is 200 bar (2844 psi), for example. The control spring 44 is a so-called 10 bar (142.2 psi) spring (irrespective of the stroke). This means that when the pressure compensator is completely open, a pressure of 200 bar−10 bar=190 bar (2844 psi−142.2 psi=2701.8 psi) is indicated to load pressure channel 22. The pump is then controlled to 210 bar (2986.2 psi) such that the pressure drop across the measuring orifice is only 10 bar (142.2 psi).

In the conventional systems, a load pressure would be indicated to the control pump which due to the weak control spring 44 would correspond to the pressure present at the input of the pressure compensator, i.e. in the prior art, the pump would be controlled at a pressure of 220 bar (3128.4 psi), so that the pressure drop across the measuring orifice would be 20 bar (284.4 psi). The pressure compensator design according to the invention therefore allows a considerable energy economy since the pressure drop across the measuring orifice is reduced when the pressure compensator 5 is completely open.

For the case that a second hydraulic consumer is now actuated through the valve block the load pressure of said hydraulic consumer being greater than the one of the abovementioned consumer, the pressure compensator associated with the second consumer is opened completely and said load pressure is indicated to the load pressure indicating channel, and the control pump is driven accordingly. By the higher pressure acting in the closing direction, the control piston 40 of the above-described consumer is displaced into its control position, where the control edge 132 has closed off the radial bore 130. In this control position, the higher load pressure of the second consumer is applied at the input of the pressure compensator. This pressure is throttled down through the pressure compensator, so that the lower pressure of the first consumer is applied to the pressure compensator output (working channel 66). This means that the same pressure differential of 10 bar (142.2 psi) arises across the measuring orifices associated with the first and second consumers.

As mentioned above, the control oil flow through the pressure limiting valve to the tank is minimized due to the increased hydraulic resistance by providing the nozzle bore 128, so that the tosses of the plant are reduced to a minimum.

Instead of the above-described variable pump, a constant pump having a three-way flow control valve could also be used.

Thus a method and a control arrangement for driving at least one hydraulic consumer have been disclosed. The control arrangement comprises a pump whose performance is adjustable as a function of the load pressure of a consumer. The driving of the latter is done via a proportional directional valve forming a measuring orifice and having a pressure compensator associated with it, through which the pressure drop across the measuring orifice is kept constant irrespective of the load pressure. According to the invention a low load pressure is indicated to the pump when the pressure compensator is completely open, so that the pressure drop across the measuring orifice is reduced.

What is claimed is:

1. A method for driving a consumer through a control arrangement, comprising:

controlling an output of a pump as a function of a load pressure in a load pressure channel, so that a pump pressure of the pump is maintained above the load pressure by a predetermined pressure differential;

keeping a pressure drop across a measuring orifice constant, irrespective of the load pressure, wherein the measuring orifice is formed by a directional valve having a directional valve slide, in which a control piston of a pressure compensator is slidably mounted;

applying pressure downstream of the measuring orifice to the control piston in an opening direction;

applying the load pressure and the force of a control spring to the control piston in a closing direction; and indicating pressure downstream of the measuring orifice to the load pressure channel when the pressure compensator is completely open that is lower than the load pressure of the consumer by an amount that is less than the predetermined pressure differential.

2. A control system for driving at least one hydraulic consumer, comprising:

a pump having an adjustable pressure, wherein the pressure is adjustable as a function of load pressure in a load pressure channel, such that the pump pressure is higher than the load pressure by a predetermined pressure differential;

a measuring orifice formed by a directional valve having a directional valve slide, in which a control piston of a pressure compensator is slidably mounted, wherein a pressure drop across the measuring orifice may be maintained constant, irrespective of the load pressure, with pressure downstream of the measuring orifice being applied to the control piston in an opening direction and the load pressure and a control spring force are applied to the control piston in a closing direction;

wherein a pressure may be indicated to the load pressure channel when the pressure compensator is completely open that indicates a load pressure that is reduced by less than the predetermined pressure differential, this reduced load pressure indication being controlled by dimensioning at least one of the spring constant and bias of the control spring.

3. A control system according to claim 2, characterized in that the spring force of the control spring (44) is about half the pressure force corresponding to said pressure differential.

4. A control system according to claim 3, characterized in that the pump is a constant pump having an input pressure compensator, or is a variable pump.

5. A control system according to claim 2, characterized in that the pressure fluid flow is controlled in such a way that the flow forces acting on the control piston (40) in combination with the force of the control spring (44) exert an approximately constant force on the control piston (40) throughout the control piston stroke.

6. A control system according to claim 5, characterized in that the control piston (40) comprises two control edges (116, 118) allowing a control cross section or a compensating cross section to be driven, enabling pressure fluid flows to be caused acting in the opposite direction.

7. A control system according to claim 6, characterized in that the pump is a constant pump having an input pressure compensator, or is a variable pump.

8. A control system according to claim 5, characterized in that the pump is a constant pump having an input pressure compensator, or is a variable pump.

9. A control system according to claim 2, characterized in that the control piston (40) comprises a nozzle bore (128) through which a connection between a space downstream of the measuring orifice to the control pressure channel (62, 22) may be opened up, in which a pressure limiting valve (45) is disposed for limiting the control pressure.

10. A control system according to claim 9, characterized in that the pump is a constant pump having an input pressure compensator, or is a variable pump.

11. A control system according to claim 9, characterized by a communication bore (106), through which the spring chamber (104) of the control piston (40) is connectable with the load pressure channel (62, 22).

12. A control system according to claim 11, characterized in that the pump is a constant pump having an input pressure compensator, or is a variable pump.

13. A control system according to claim 11, characterized in that a damping nozzle (108) is provided in the communication bore (106).

14. A control system according to claim 13, characterized in that the pump is a constant pump having an input pressure compensator, or is a variable pump.

15. A control system according to claim 2, characterized in that the pressure differential corresponds to about 20 bar and the force of the control spring (44) corresponds to about 10 bar.

16. A control system according to claim 15, characterized in that the pump is a constant pump having an input pressure compensator, or is a variable pump.

17. A control system according to claim 2, characterized in that the pump is a constant pump having an input pressure compensator, or is a variable pump.

* * * * *

UNITED STATES PATENT AND TRADEMARK OFFICE

CERTIFICATE OF CORRECTION

PATENT NO. : 6,516,614 B1
DATED : February 11, 2003
INVENTOR(S) : Burkhard Knoll It is certified that error appears in the above-identified patent and that said Letters Patent is hereby corrected as shown below:

Title page, Item [54] and Column 1, lines 1 and 2,
Please amend the title as follows:
"Item [54] METHOD AND CONTROL DEVICE FOR CONTROLLING A HYDRAULIC CONSUMER" change to -- "A METHOD AND CONTROL ARRANGEMENT FOR DRIVING A HYDRAULIC CONSUMER" --

Title page,
Please amend Assignee's address as follows:
"Item [73], Bosch Rexroth AG, Lohr" change to -- "Bosch Rexroth AG, Stuttgart, Germany" --.

Signed and Sealed this

Twenty-ninth Day of July, 2003

JAMES E. ROGAN
*Director of the United States Patent and Trademark Office*